WEIGHTED HOLE COUNT CHECK FOR PUNCH CARD EQUIPMENT
Filed Nov. 6, 1964
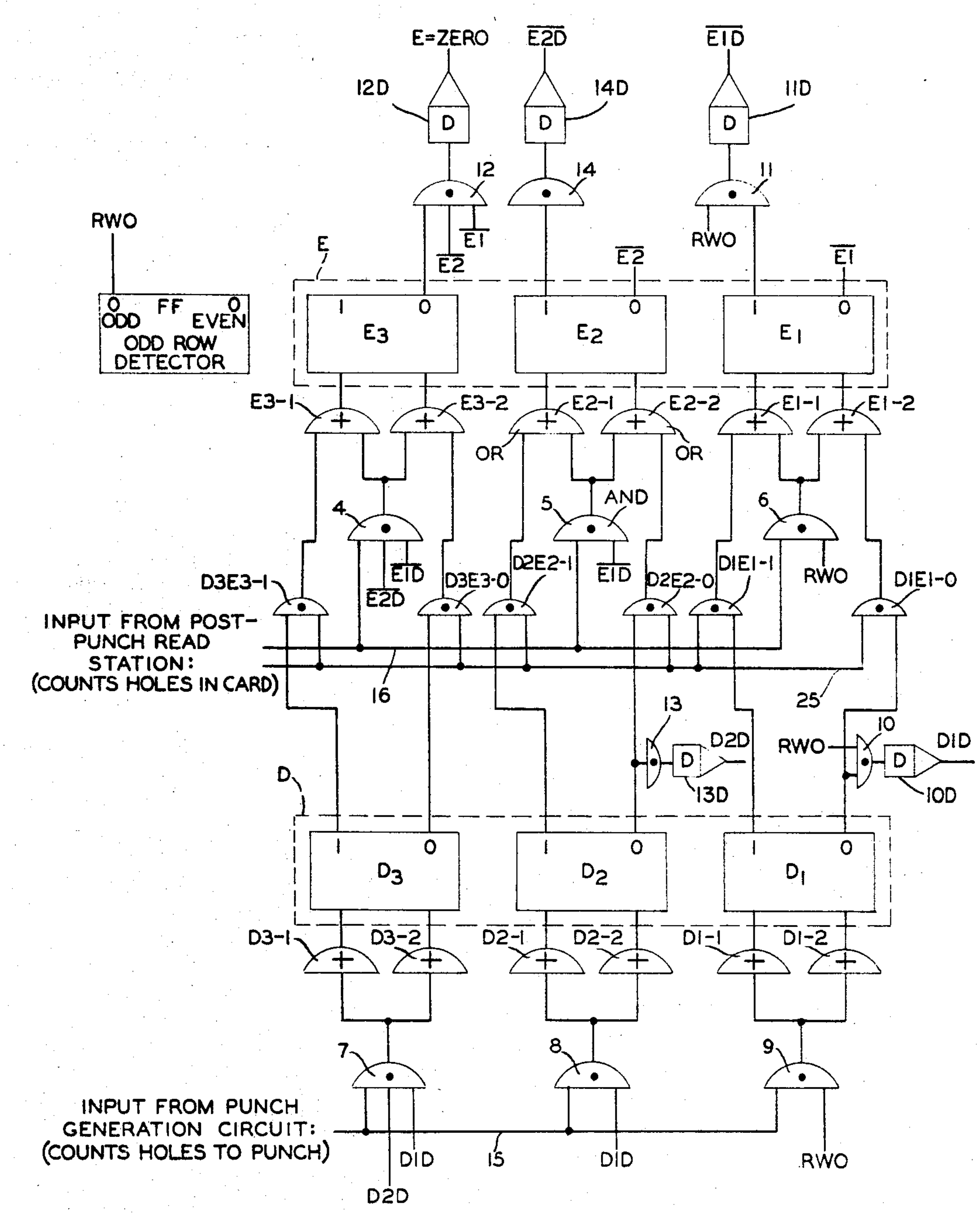
INVENTOR.
JAMES O. JONES
BY [signature]
ATTORNEY

United States Patent Office 3,422,250
Patented Jan. 14, 1969

3,422,250

WEIGHTED HOLE COUNT CHECK FOR PUNCH CARD EQUIPMENT

James O. Jones, Center Square, Pa., assignor to Sperry Rand Corporation, New York, N.Y., a corporation of Delaware Filed Nov. 6, 1964, Ser. No. 409,422
U.S. Cl. 235—61.7 4 Claims
Int. Cl. G06k *1/00;* G06k *1/04;* G06f *11/00*

ABSTRACT OF THE DISCLOSURE

The present device provides a first register-counter into which there is a signal transmitted for each hole to be punched in a row of a punched card. The number (value) of these holes to be punched is counted and the equipment is arranged to be doubled for every other row. The device also provides a second register-counter into which there is a signal transmitted for each hole actually punched and which also provides for doubling the value of the holes counted for every other row. Prior to counting the number of holes actually punched, the value of the holes intended to be punched is transmitted into the second register and when the signals of the holes actually punched are received at the second register-counter, these signals or values are subtracted from the values present therein. Accordingly, when the second register is reduced to zero, the system recognizes that the number of holes actually punched is equal to the number of holes that should have been punched.

This invention relates to punch card equipment, and more particularly, to a method and apparatus for detecting what is known as "late punching."

In the preparation of a set or deck of punch cards it is highly desirable to determine whether or not what has been actually punched in the card is what should have been punched therein. In the early tabulating schemes summary punching was performed (i.e., totals which were calculated in a tabulator or computer were punched in a card by an auxiliary machine) without automatically checking whether or not what had been punched in the card was identical to the totals calculated in the tabulator or computer. Attempts to provide a means for automatically checking such punching included a scheme to count the total bits to be punched as presented by the computer and count the total number of punches actually punched and thereafter compare the two totals. While this arrangement has merit it does not provide a means for detecting "late punching."

Late punching may be caused by a malfunction, such sluggish operation of a punch actuator to the extent that the punch perforates a hole in the card in a row following the row to which such a perforation or punch-out should have been made. Obviously having a hole punched in the wrong row would lead to incorrect reports and therefore is highly undesirable. My invention, to be described and claimed hereinafter, provides a means to determine whether or not what has been actually punched in the card is what should have been punched therein, and further a means to detect "late punching."

In accordance with this invention I employ, instead of a straight numerical count of the holes punched in a card, what is termed a weighted count; i.e., one in which, for example, a weight of 1 is assigned to odd numbered rows, and a weight of 2 to even numbered rows. This weighting procedure was designed so that late punching can be detected merely by passing the card to be checked through the equipment. The equipment consists of a pair of registers, one of which counts the pulse orders to the punch and the other of which counts the holes actually punched in the card, together with an odd row detector, and means for transferring the count from the first register to the second and comparing it with the count received by the second register, and providing a signal indicating no late punching error if the weighted counts check, as they should if there has been no late punching.

From the foregoing, it will be understood that it is an object of this invention to provide a method and apparatus for determining that what has been punched corresponds with what should have been punched as well as a means for detecting late punching.

It is a further object of this invention to provide a system for detecting late punching which provides a maximum of protection against such errors, and in which the equipment required is still relatively simple and inexpensive.

Still other objects and advantages of my invention will be apparent from the specification.

The features of novelty which I believe to be characteristic of my invention are set forth with particularity in the appended claims. My invention, itself, both as to its fundamental principles and as to its particular embodiments, will best be understood by reference to the specification and accompanying drawing, in which the single figure is a schematic diagram of apparatus according to my invention.

Referring now more particularly to the drawing, the apparatus comprises a pair of registers D and E shown enclosed in dashed lines. Each register comprises three flip-flops $D_1$, $D_2$, and $D_3$, and $E_1$, $E_2$, and $E_3$, each of which gives either a 0 or a 1 output depending on the state of the flip-flop, whether set or reset. Both D and E registers operate on modulo 8, i.e., each register counts pulses from zero to seven inclusive, while an 8th pulse will reset the register. The registers D and E are used to develop and compare their respective counts. Register D is arranged to count up, while register E is arranged to count down.

In connection with the following description assume that when a flip-flop is conducting in its "zero" state that the "zero" output is low and likewise when a flip-flop is conducting in its "one" state the "one" output is low. Further, assume that the AND gates respond to provide a low output when two low inputs are applied thereto and that each delay amplifier inverts the polarity of its applied input signal. The circuitry to provide the foregoing is well known in the art and need not be described.

In the operation of my invention, the D register counts the pulses received from the punch generation circuit over conductor 15, and which are fed to "and" gates 7, 8, and 9, the outputs of which are fed as follows:

The output of "and" gate 7 is fed to "or" gates D3–1 and D3–2; that from "and" gate 8 goes to "or" gates D2–1 and D2–2; and that from "and" gate 9 to "or" gates D1–1 and D1–2. The output from "or" gates D3–1 and D3–2 goes to flip-flop $D_3$, that from "or" gates D2–1 and D2–2 to flip-flop $D_2$, and that from "or" gates D1–1 and D1–2 to flip-flop $D_1$.

The E register is similarly arranged, except that it counts down instead of up. The output from the post-punch card reading station, which reads the card just punched while the succeeding card is being punched (in the form of a pulse for each hole in the card) is fed to conductor 16 and thence to "and" gates 4, 5, and 6. "And" gate 4 feeds "or" gates E3–1 and E3–2 which in turn feed flip-flop $E_3$. "And" gate 5 feeds "or" gates $E_2$–1 and E2–2, and the output of "or" gates E1–1 and E1–2 feed flip-flop $E_2$. "And" gate 6 feeds "or" gates E1–1 and E1–2, the output of which goes to flip-flop $E_1$.

The "zero" output of flip-flop $D_1$ is passed to "and"

gate 10 and if "and" gate 10 is fully conditioned to delay amplifier 10D, and after being inverted over conductor D1D to the D1D inputs of "and" gates 7 and 8. The "zero" output of flip-flop $D_2$ is passed to "and" gate 13 and delay amplifier 13D and after being inverted over conductor D2D to the input of "and" gate 7. "And" gate 13 has only one input and for this particular circuit provides simply the necessary diode.

In the E register, flip-flop $E_1$ is fed from "or" gates E1–1 and E1–2 which in turn are fed from "and" gate 6. The "zero" output of flip-flop $E_1$ is fed over conductor $\overline{E1}$ to the inputof "and" gate 12, and the "one" output of flip-flop E1 is passed to "and" gate 11 and delay amplifier 11D and over conductor $\overline{E1D}$ to the input of "and" gates 4 and 5. Flip-flop $E_2$ is fed from "or" gates E2–1 and E2–2 which in turn are fed from "and" gate 5. The "zero" output of flip-flop $E_2$ is fed over conductor $\overline{E2}$ to the input of "and" gate 12, and the "one" output of flip-flop $E_2$ through "and" gate 14 and delay amplifier 14D over conductor E2D to the input of "and" gate 4.

Flip-flop $E_3$ is fed from "or" gates E3–1 and E2–2 which in turn are fed from "and" gate 4. The "zero" output of flip-flop $E_3$ goes to "and" gate 12, which through its delay amplifier, feeds the $E$=Zero conductor, and thus provides a signal indicating no late punching error, if none has occurred.

To provide for doubling the count for even lines, I provide an odd row detector. In its simplest form this may be a flip-flop FF providing an "odd" output as each odd numbered line of the punched card is read in the post-scan reader, and an "even" output when an even numbered line is read. The "odd" output of the odd row detector is impressed on conductor RW0 and thence to an input of "and" gates 6, 9, 10 and 11. When an odd numbered row is being scanned, gates 6, 9, 10 and 11 are partially enabled by the RW0 signal and signals transmitted to gates 9 and 6 are respectively fed into the input of registers $D_1$ and $E_1$. When, however, an even numbered row is being scanned, gates 6 and 9 are blocked, leaving $E_1$ and $D_1$ unchanged when signals are transmitted thereto. Gates 10 and 11 are blocked when an even numbered row is being scanned thereby providing $\overline{E1D}$ and D1D signals respectively which are low signals and hence incoming signals are fed into registers $E_2$ and $D_2$ respectively, thus giving them the weight of 2 for each incoming signal.

It should be understood that the E register counts at the post-punch read station the number of holes actually punched, and this takes place while the next card is being punched. The D register counts the punch impulses from the punch generating circuit. The count is doubled in each register for even numbered rows. When the complete card consisting of twelve rows of information has been punched, the count in register D is transferred to register E, through "and" gates D1E1–0, D1E1–1, D2E2–0, D2E2–1, D3E3–0 and D3E3–1, and "or" gates E1–1, E1–2, E2–1, E2–2, E3–1 and E3–2 in response to a transfer pulse on line 25. As the card, which has been punched and which has had its count of punch orders transferred to the E register, reaches the post-punch reader, register E counts down, reducing the count transferred to the E register by one for each hole punched in an odd row and by two for each hole punched in an even row.

As stated, if there has been no late punching, the counts received by the D and E registers are the same, and subtracting the E counts from the count transferred from register D will leave zero, and give rise to the $E$=Zero signal emanating from amplifier 12D indicating no late punching. It should be remembered the operation of the D and E register differs in time by one card cycle, i.e., the second card is being punched while the first is being read.

As an example of the way in which the weighted count according to my invention operates, the following table shows the conventional and weighted counts for the twelve rows of a card. Because the system operates on modulo 8, unless the count for each line is evenly divisible by 8, there will be a remainder equal to the count minus the largest multiple of 8 which can be subtracted, and this remainder is added to the count for the succeeding row. An example of the actual and weighted counts for an arbitrarily selected card are:

TABLE I

| | Count Remainder | | | |
|---|---|---|---|---|
| | Regular Count | | Weighted Count | |
| R1 | 12 | 4 | 12 | 4 |
| R2 | 18 | 6 | 36 | 0 |
| R3 | 9 | 7 | 9 | 1 |
| R4 | 15 | 6 | 30 | 7 |
| R5 | 16 | 6 | 16 | 7 |
| R6 | 17 | 7 | 34 | 1 |
| R7 | 22 | 5 | 22 | 7 |
| R8 | 12 | 1 | 24 | 7 |
| R9 | 14 | 7 | 14 | 5 |
| R10 | 14 | 5 | 28 | 1 |
| R11 | 14 | 3 | 14 | 7 |
| R12 | 14 | 1 | 28 | 3 |

In Table I, the first vertical column indicates that the horizontal rows of the table show information pertaining to Rows 1 through 12 respectively of a conventional tabulating card. The second vertical column shows the conventional hole count for each such row on a particular arbitrarily chosen card. The third vertical column shows the cumulative remainders of these conventional hole counts modulo 8. For example, for Row 1 the hole count of 12 has a remainder modulo 8 of 12—8=4. For Row 2 the hole count of 18 has a remainder modulo 8 of 18—(2×8)=2, which when added to the remainder from Row 1 gives a cumulative remainder of 4+2=6. The computation for Row 3 similarly yields a cumulative remainder of 7. For Row 4 the result of the computation is 14, but the remainder modulo 8 is 14—8=6.

The fourth column of the table shows the hole count for the same tabulating card when weighted in accordance with this invention by doubling the figure for every second row, e.g. for Rows 2, 4, 6, 8, 10 and 12. The cumulative remainders for these weighted hole counts arrive at by the same type of computation, are shown in the fifth column.

By way of contrast, Table II shows a portion of the same information for the same tabulating card in the event that a late punching has transferred one hole from Row 1 to Row 2.

TABLE I

| | Count Remainder | | | |
|---|---|---|---|---|
| | Regular Count | | Weighted Count | |
| R1 | 11 | 3 | 11 | 3 |
| R2 | 19 | 6 | 38 | 1 |
| R3 | 9 | 7 | 9 | 2 |
| R4 | 15 | 6 | 30 | 0 |
| R5 | 16 | 6 | 16 | 0 |
| R6 | 17 | 7 | 34 | 2 |
| R7 | 22 | 5 | 22 | 0 |
| R8 | 12 | 1 | 24 | 0 |
| R9 | 14 | 7 | 14 | 6 |
| R10 | 14 | 5 | 28 | 2 |
| R11 | 14 | 3 | 14 | 0 |
| R12 | 14 | 1 | 28 | 4 |

The hole count for Row 1 is deficient by 1. Thus, in both the regular and weighted counts it equals 11 instead of 12 as in the previous table. The regular hole count for Row 2 is increased by 1, and thus equals 19 instead of 18 as previously. The weighted hole count for Row 2 is therefore 19×2=38 instead of 36 as previously. The remaining regular and weighted hole counts for Row 3 through 12 are the same as in the previous table.

Notice what effect the late punching has on the cumulative remainders. In the case of the regular count, the first remainder is 3, representing a deficiency of 1 compared to the previous table. But the Row 2 remainder, 19−(2×8)=3, is increased by 1. Therefore when this figure is added to the remainder of Row 1 to form the Row 2 cumulative remainder, the result is 3+3=6. The deficiency in Row 1 is cancelled by the excess in Row 2, with the result that the cumulative remainder for Row 2 is the same as in the previous table. All subsequent cumulative remainders for Rows 3 through 12 are likewise the same as in the previous table, so that the final cumulative remainder for Row 12 does not reflect the late punching.

But the weighted remainder does show the late punching. Once again the first row remainder is 3, representing a deficiency of 1. The Row 2 remainder however because of the doubling operation, has an excess which overbalances the deficiency. The remainder is $$38-(4\times8)=6$$

When added to the remainder from Row 1 this gives 6+3=9, for a cumulative remainder, modulo 8, of 1. Note that this is different by 1 from the cumulative remainder of 0 seen in the same position in the previous table. Note further that the difference of 1 is then maintained all the way down the weighted cumulative remainder column, and so is reflected in the last figure. Thus the inequality of the final Row 12 weighted cumulative remainders from the properly punched card (first table) and the improperly punched card (second table) reveals the late punching.

While it is not shown for the sake of not complicating the figure, it should be understood that the D register is provided with a reset line which is a means for resetting the D register after a card has been read. It is not necessary to reset the E register since the transfer from the D register into the E register clears out the remaining count in the E register.

In the foregoing I have shown and described certain preferred embodiments of my invention, and the best mode presently known to me for practicing it, but it will be understood that modifications and changes may be made without departing from the spirit and scope thereof, as will be clear to those skilled in the art.

The embodiments of the invention in which an exclusive property or privilege is claimed are defined as follows:

1. A punch verifier circuit to determine if the holes which are intended to be punched in a card have been actually punched in the card comprising:

(a) first and second signal registers;

(b) first gating means connected to said first register to transmit signals thereto from a punch generating means;

(c) second gating means connected to said second register to transmit signals thereto from a punch reading station;

(d) odd row signal generating means to generate odd row signals when a card passing through said verifying circuit is to be punched in an odd row and have its odd row holes read;

(e) circuitry means connected to said odd row signal generator means to receive said odd row signals and be responsive thereto and further connected to said first and second gating means whereby when said odd row signal is generated said first and second registers advance one step in response to a single signal being applied thereto and whereby when said odd row signal is not generated said first and second registers advance by two for each signal that is applied thereto;

(f) third gating means connected to said first register and to said second gating means to transmit the signal count from said first register into said second register.

2. A punch verifier circuit according to claim 1 wherein said first register counts by increasing its cumulative number each time it receives a signal input thereto and wherein said second register decreases its cumulative count each time there is a signal input received and wherein there is further included detecting means connected to said second register to determine when said second register has a value of zero.

3. Equipment for verifying punching and detecting late punching in punch cards wherein each of said punched cards has every other row of punches designated as an alternate row comprising in combination:

first and second registers, means for supplying first count signals, which represent holes to be punched in a punched card passing through said equipment, to said first register thereby acquiring first count data therein;

means for supplying to said second register, second count signals representing the number of holes actually punched in each card row of a card passing through said equipment, thereby receiving second counted data therein;

means for doubling the number of said first and second count signals associated with alternate rows of punches on said cards as they are received in each of said registers, means for transferring said first count data from said first register to said second register;

means for subtracting said second count data from said transferred first count data as signals are received by said second register thereby driving said second register towards zero value and means for generating a zero signal when said register equals zero count.

4. Equipment for verifying punching and detecting late punching in punch cards according to claim 3 wherein said first and second registers each comprise a plurality of flip-flops in tandem and wherein said means for doubling includes means for selectively blocking input signals to the first flip-flop stage in each of said first and second registers for alternate card rows.

References Cited

UNITED STATES PATENTS

| | | | |
|---|---|---|---|
| 2,328,654 | 9/1943 | Lake et al. | 235—61.7 XR |
| 2,359,616 | 10/1944 | Bryce | 235—61.8 XR |
| 2,886,240 | 5/1959 | Linsman. | |
| 2,943,787 | 7/1960 | Cartwright | 235—61.71 |
| 2,954,164 | 9/1960 | Schreiner et al. | 235—61.71 XR |

MAYNARD R. WILBUR, *Primary Examiner.*

SOL SHEINBEIN, *Assistant Examiner.*

U.S. Cl. X.R.

235—153